Aug. 30, 1927.

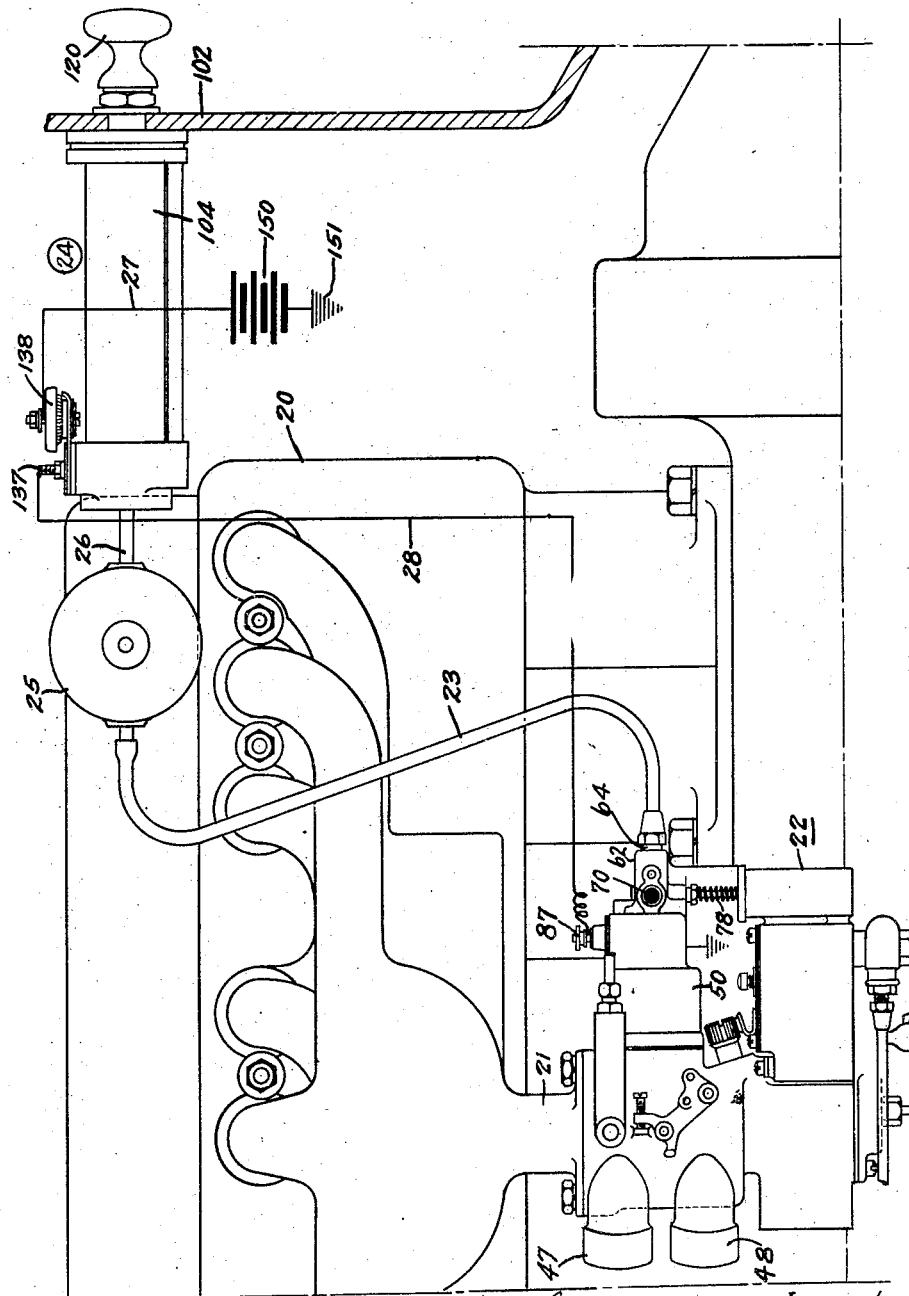

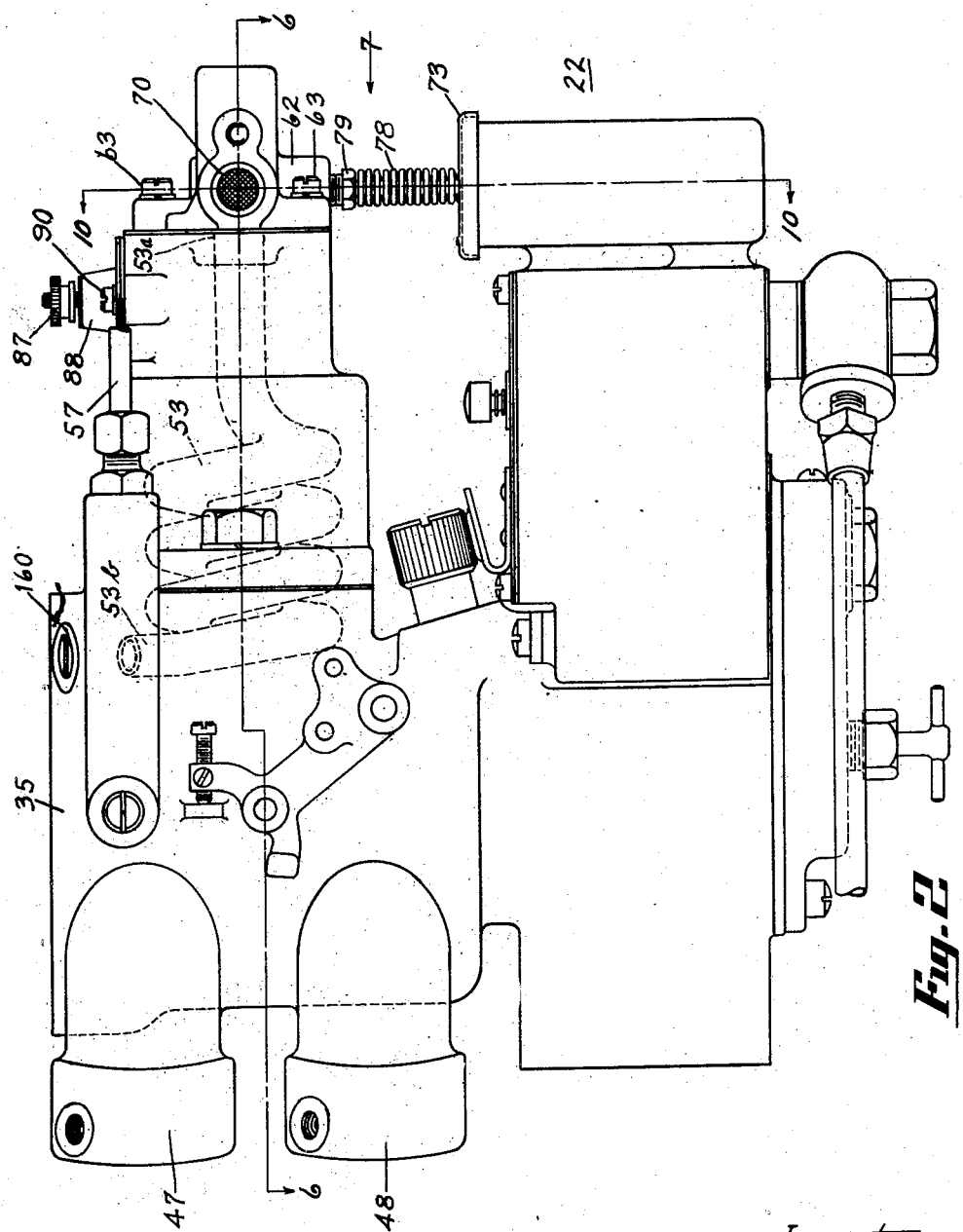

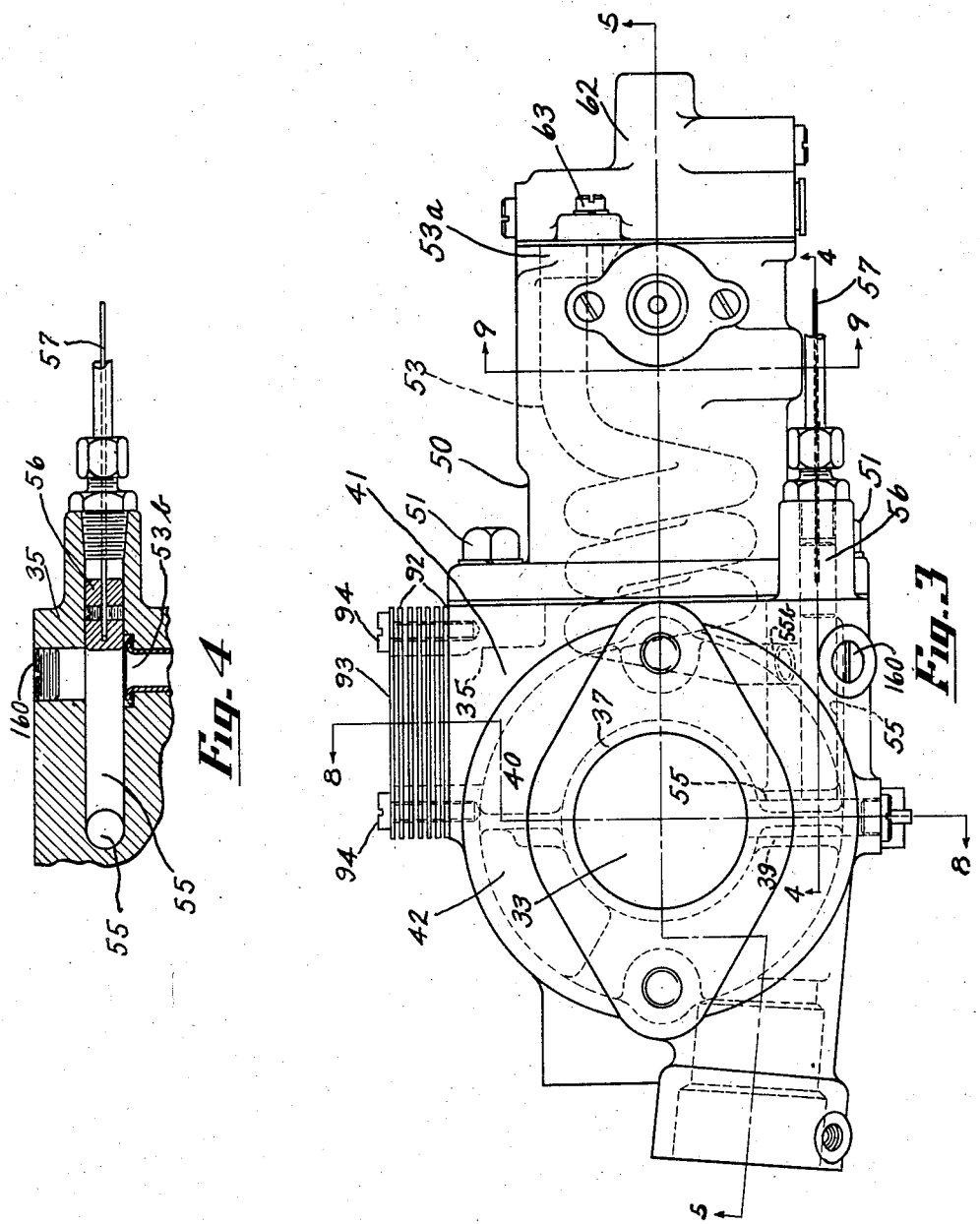

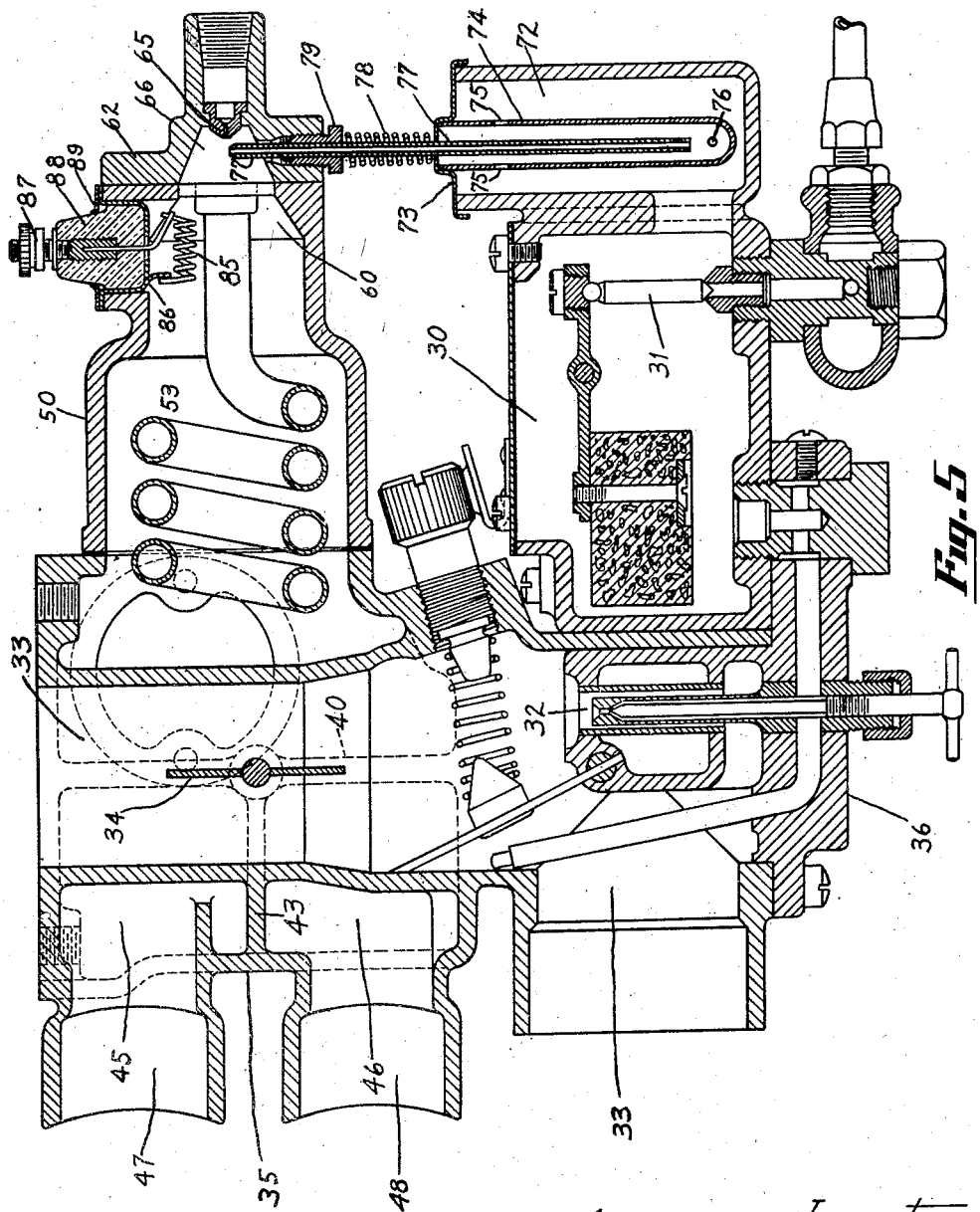

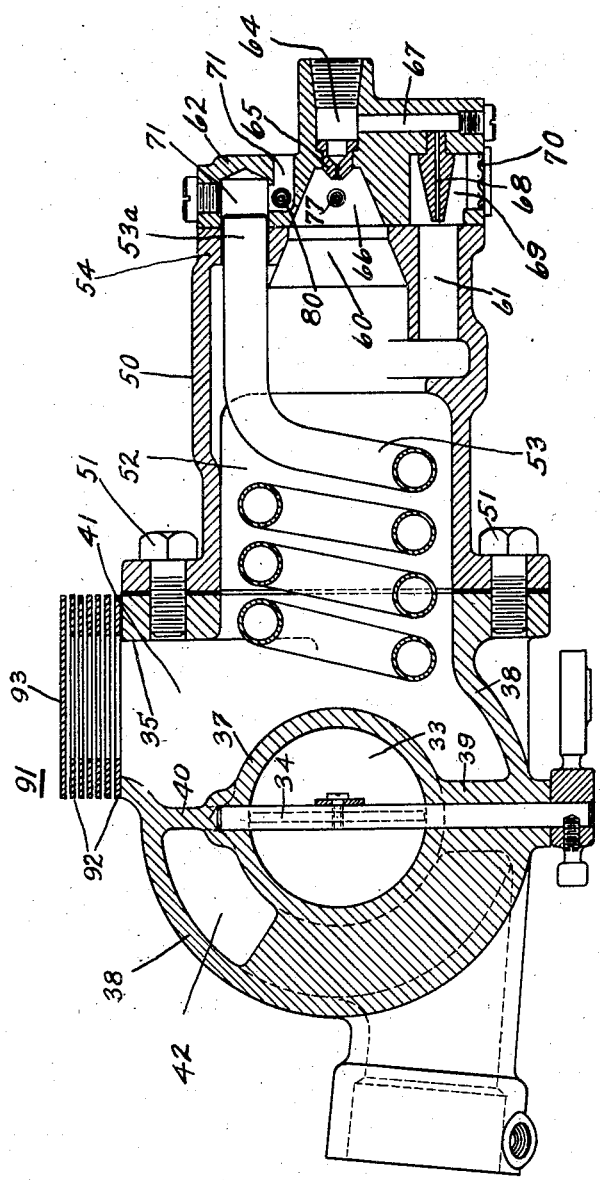

J. H. HUNT ET AL 1,640,774

HAND PUMP PRESSURE BURNER

Filed May 23, 1923

Witnesses
Irvin A. Greenwald
J. W. McDonald

Inventors
John H. Hunt and Hugh Wallace
By Joe W. Morrison
Their Attorney

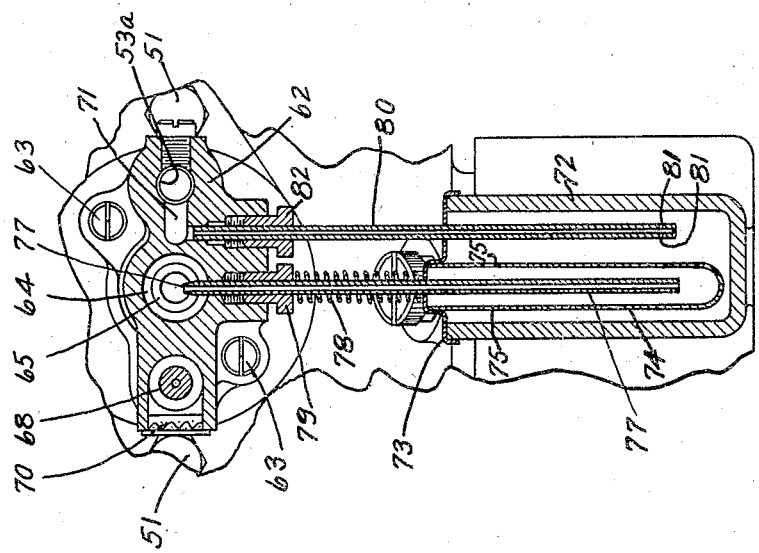
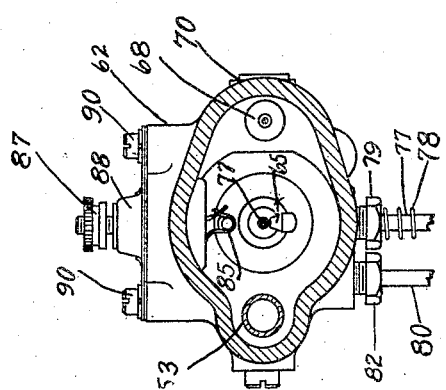

Patented Aug. 30, 1927.

1,640,774

UNITED STATES PATENT OFFICE.

JOHN H. HUNT AND HUGH WALLACE, OF DAYTON, OHIO, ASSIGNORS, BY MESNE ASSIGNMENTS, TO DELCO-REMY CORPORATION, OF DAYTON, OHIO, A CORPORATION OF DELAWARE.

HAND-PUMP PRESSURE BURNER.

Application filed May 23, 1923. Serial No. 640,999.

This invention relates to apparatus for heating fuel for an internal combustion engine to facilitate starting especially when the engine is cold.

One form of fuel heating device to which the present invention relates is disclosed in the copending application of Hunt, Wallace and Fitzsimmons, Serial No. 605,342, filed December 7, 1922. The device shown in that application includes auxiliary means for providing an engine fuel mixture in addition to the fuel provided by the engine carburetor. The auxiliary fuel mixture is conducted through a heating duct located in a stove heated by a liquid fuel burner, and then passed into the engine intake to heat the fuel supplied by the engine carburetor.

In the present invention it is an object to combine the stove and carburetor in a unitary structure to facilitate assembling on an engine to reduce the cost of manufacture, and also to use the burner to heat the carburetor itself as well as the auxiliary fuel mixture which is discharged into the fuel provided by the carburetor.

Further objects and advantages of the present invention will be apparent from the following description, reference being had to the accompanying drawings, wherein a preferred embodiment of the present invention is clearly shown.

In the drawings:

Fig. 1 is a fragmentary side view of an internal combustion engine provided with the present invention;

Fig. 2 is a side elevation of the unitary carburetor and heating stove on a larger scale than shown in Fig. 1;

Fig. 3 is a top plan view of the structure shown in Fig. 2;

Fig. 4 is a sectional view taken on the line 4—4 of Fig. 3;

Fig. 5 is a sectional view taken on the line 5—5 of Fig. 3;

Fig. 6 is a sectional view taken on the line 6—6 of Fig. 2;

Fig. 9 is a sectional view taken on the line 9—9 of Fig. 3; and

Fig. 10 is a sectional view taken on the line 10—10 of Fig. 2.

Figure 8:
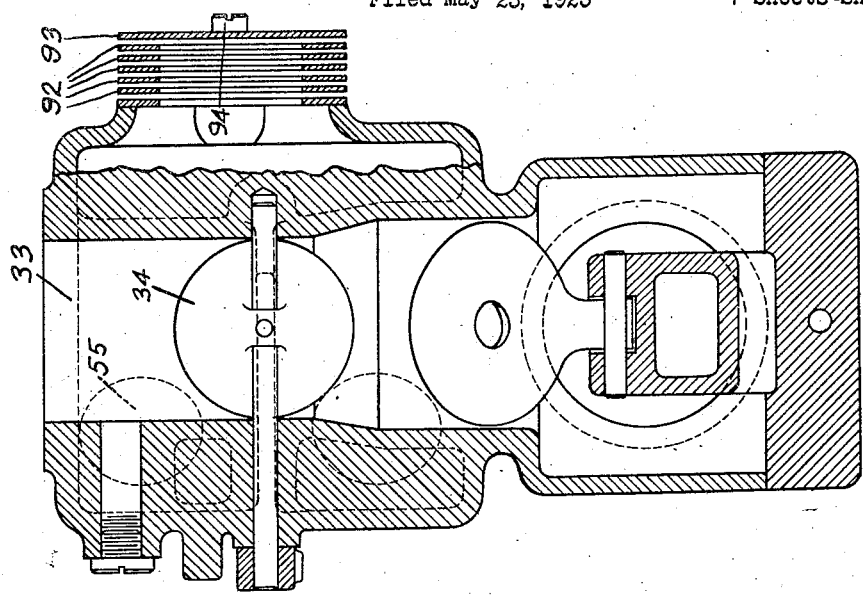
Fig. 8 is a sectional view taken on the line 8—8 of Fig. 3.
Figure 7:
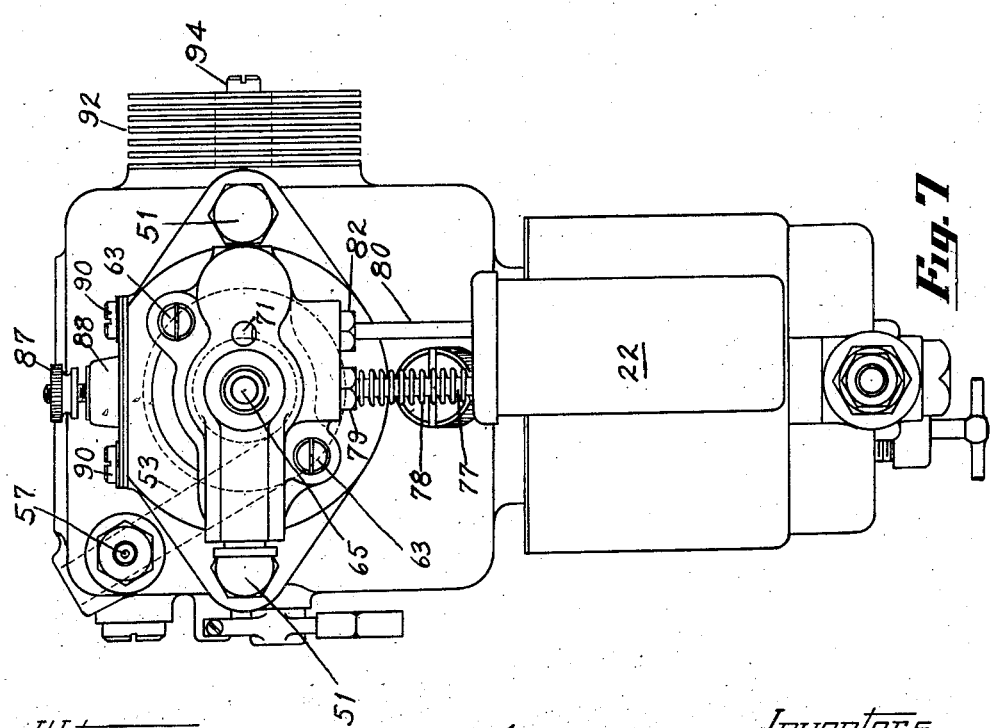
Fig. 7 is an end view of the unitary structure looking in the direction of arrow 7 in Fig. 2.

In the drawings, 20 designates an internal combustion engine having an intake 21 supporting a carburetor stove unit 22 connected with a pump unit by a flexible pipe 23, air pressure equalizer 25 and pipe 26.

The pump unit 24 includes a barrel 104 containing a piston reciprocated by a handle 120. This unit 24 is adapted for attachment to the dash board 102 of an automobile. An electrical switch is located within the pump unit 24 and is caused to be closed when the handle 120 is pulled toward the operator and is opened again when the handle is moved to the limit of travel away from the operator. One side of the switch is connected with resistance unit 138 which is connected by wire 27 with battery 150 grounded at 121, the other side of said switch being connected with terminal 137 connected to the burner heating coil terminal 87 by wire 28, the coil being grounded on the engine frame. The pump unit is disclosed in detail in the copending application of J. H. Hunt and Hugh Wallace, Serial No. 641,270, filed May 24, 1923.

The particular carburetor chosen for purposes of illustration in connection with the present invention is the Marvel, a well known type of carburetor used with automobile engines. This carburetor includes a fuel bowl 30 (see Fig. 5) controlled by a float valve 31 from which fuel is conducted to a nozzle 32 in communication with an engine fuel passage 33 controlled by a butterfly valve 34 rotatably mounted upon carburetor frame or body 35. As shown in Fig. 5 this frame 35 includes the passage 33 and provides a support for the fuel bowl 30 and a casting 36 carrying the nozzle 32 and providing passages from the fuel bowl to the nozzle.

The carburetor body 35 is provided with two heating chambers surrounding the passage 33, one chamber to be heated by engine exhaust gases and the other by the combustion products of the fuel heating stove. The cylindrical wall 37 surrounding the passage 33 (see Fig. 6) is surrounded by a somewhat cylindrical wall 38 providing a jacket which is divided by partitions 39 and 40 into chambers 41 and 42. The chamber 42 is divided by a baffle or horizontal partition 43 into upper and lower chambers 45 and 46. During the operation of the engine, the chamber 42 may be heated by passing exhaust gas through an inlet 47 over the partition 43, then down into the lower chamber 46 and out through an outlet 48 leading to the engine muffler. The other chamber 41 receives its heat from a stove which will now be described.

A stove or burner body 50 is attached to the carburetor frame 35 by means of bolts 51 and is directly in communication with the heating chamber 41. The burner body 50 provides a combustion chamber 52 in which is located a heating pipe coil 53, having the end 53$^a$ projecting through an aperture in the end wall 54 of the body 50 and having the other end attached as shown at 53$^b$ in Fig. 4 to the carburetor frame 35. The pipe 53 communicates with a passage 55 leading through the frame 35 into the carburetor fuel passage 33. This communication is controlled by a valve 56 slidable within the passage 55 and actuated by means of a Bowden wire control 57 which may be connected by means not shown with an operating handle in convenient reach of the driver.

The end wall 54 of the burner body 50 is provided with a conical aperture 60 and with a combustion air passage 61 (see Fig. 6) which are covered by a nozzle block 62 attached to the body by screws 63. The nozzle block is provided with an air duct 64 leading to an air nozzle 65 which projects into a conical recess 66 or jet chamber directly communicating with the conical aperture 60. The duct 64 has a branch 67 connected with an air nozzle 68 which projects into combustion air inlet passage 69 communicating directly with the combustion air passage 61. A screen 70 is placed in passage 69. The block 62 is provided with another air duct 71 leading to the pipe 53. The air duct 64 is connected with pipe 23. The other ducts 69 and 71 are open to the outside air.

The carburetor bowl 30 communicates with an auxiliary bowl or well 72 in which fuel is maintained at the same level as in bowl 30. Well 72 is provided with a cover 73 from which is suspended a fuel metering well 74 having air inlet 75 and a fuel metering inlet 76. A nozzle 77 extends from adjacent the bottom of well 74 up through the block 62 which supports it, and the upper end of nozzle 77 projects into the jet chamber 66. A spring 78 bearing at one end against a bushing 79 threaded into the body 62 and at the other end against the cover 73, serves to hold the cover in position. The nozzle 77 provides fuel for the stove burner.

Fuel for the engine starting fuel mixture is conducted through a nozzle 80 extending from the well 72 up to the air passage 71 (see Figs. 6 and 10). Nozzle 80 is plugged at its lower end and is provided with fuel metering passages 81. The bushing 82 secures the nozzle 80 to the block 62.

The fuel spray issuing from the top of nozzle 77 and through the conical aperture 60 is ignited by means of the hot wire coil 85 (see Fig. 5) arranged preferably coaxial with the jet rather than transverse to it. One end of coil 85 is attached to a cup shaped conducting member 86 which is mounted directly upon the burner body 50 and consequently is grounded upon the engine frame. The other end of coil 85 is connected with a terminal 87 imbedded in a porcelain knob 88 which is received by the cup 86 and is held in position by washer 89. This heating unit is held in position by screws 90.

The products of combustion from the burner pass from the chamber 41 out through a safety screen 91 (see Fig. 6) comprising a plurality of washers 92 and a disc 93 secured by means of screws 94 but spaced from each other so that the burnt gases may pass out from the chamber 41, the spacing of these washers being such as to prevent a flame issuing from the body 35.

*Mode of operation.*

To start the engine when cold the valve 56 is opened. The knob 120 is pulled out, thus closing the switch contacts at which time the battery 150, grounded at 151, will be connected with the heating unit terminal 87 by means of wire 27, resistance unit 138, the switch embodied in the pump unit 24, terminal 137 and wire 28. The heating coil 85 will therefore be heated by current from the battery. The operator reciprocates the handle 120 thereby causing air pressure to be built up in the equalizer 25 and air to flow through the pipe 23 to the air passages 64 and 67 (see Fig. 6). Air flowing out through the nozzle 65 across the top of fuel nozzle 77 will cause fuel to be elevated through this nozzle 77 to the jet recess 66 and the fuel to be sprayed out from recess 66 through the aperture 60 and into the combustion chamber 52. This spray is ignited by coming in contact with the heated coil 85. Air for combustion purposes is supplied by means of the air jet 68 and by air which is induced to flow through the passages 69 and 61 by virtue of the issuance of air under pressure from the jet 68. The burning fuel mixture heats the chambers 52 and 41, thus causing the pipe 53 and the carburetor passage 33 to be heated.

The engine is started in the usual manner, preferably by means of an electric starting motor. During the cranking of the engine, a fuel mixture will be drawn into the engine intake from two sources. One source is the usual one provided by the carburetting means located below the throttle valve 34. This mixture will be heated to some extent on coming into contact with the heated wall of the passage 33. The other source of fuel during the engine cranking period is a fuel mixture provided by fuel ascending through the nozzle 80 into the passage 71, mixing with air entering said passage. This fuel mixture flows through the pipe 53 and is heated by contact with the heated pipe. This fuel mixture flows past the valve 56 through the passage 55 and then into the intake passage 33 above the throttle valve 34. The fuel mixture from the pipe 53 is comparatively rich for starting and is heated to a higher temperature than the mixture entering from below the throttle valve 34. In this manner the composite fuel mixture will be heated to a temperature sufficient to facilitate engine starting.

After the engine has become self operative, pumping can be discontinued, but care should be taken to push the pump handle 120 entirely into the pump unit 24. This movement of the handle 120 will cause the switch contacts to be broken thus causing the circuit between the battery 150 and the resistance unit terminal 87 to be interrupted. Thus the moving of the pump handle to a position where it is least in the way of the driver will cause the burner circuit to be broken.

Obviously since air is not supplied by the pump to the burner, no fuel will be drawn up through the nozzle 77 for heating the stove. However, the operation of the engine will cause fuel to be sucked up through the nozzle 80. To avoid this the valve 56 should be moved to closed position to block the passage of fuel from pipe 53 to the passage 55 and thereby cut off the nozzle 80 from the suction of the engine. The fuel mixture entering the engine after it has become self operative can be heated if desired by the exhaust gases from the engine.

From the foregoing it is apparent that there has been provided a fuel vaporizer and carburetor unit simply by the addition of a few parts, and by the modification of the fuel bowl and the carburetor body casting of an existing carburetor. The stove heats both of the fuel passages which respectively conduct fuel from the separate carburetting devices to the engine intake. The carburetor body provides a part of the heating chamber in which the fuel heating coil is located. The carburetor body supports the burner body forming a part of the heating chamber, and the burner body supports a nozzle block supporting the various nozzles of the apparatus. The fuel nozzles extending within the nozzle block receive fuel directly from the carburetor bowl which has been modified to provide an additional fuel well. The nozzle block can be removed to allow replacement of the stove body and heating pipe coil should these parts wear out due to being heated or for other reasons. It is apparent that the burner can be readily disassembled. By removing screws 63 the nozzle block 62 can be removed, carrying with it the fuel nozzles. The cover 73 and the fuel well 74 can then be removed from the bowl 72. Since the end 53ª of pipe 53 extends loosely through the body 50, body 50 can be removed from the carburetor frame 35 by removing the screws 51. To remove the pipe 53 the screw plug 160 is removed, see Fig. 4, thus providing access to the crimped over end 53ᵇ of pipe 53. With a suitable tool the crimped end can be straightened out to allow the pipe 53 to be removed.

While the forms of mechanism herein shown and described constitute a preferred form of embodiment of the invention, it is to be understood that other forms might be adopted, all coming within the scope of the claims which follow.

What we claim is as follows:

1. In a fuel burner for heating the fuel charge of an internal-combustion engine, the combination with a member attached to the engine intake and having a fuel passage 33 and a heating chamber 41 for the passage; of a burner body 50 providing a combustion chamber 52 attached to said member and communicating with the heating chamber 41; a nozzle block detachably secured to the burner body and having an air duct 71; an engine fuel duct 53 connected with said air duct and extending through said chambers and connected with said engine fuel passage 33; a fuel nozzle 80 supported by said block and projecting into said air duct; and means for supplying said nozzle with fuel.

2. In a fuel burner for heating the fuel charge of an internal-combustion engine, the combination with a member attached to the engine intake and having a fuel passage 33 and a heating chamber 41 for the passage; of a burner body providing a combustion chamber 52 attached to said member and communicating with the heating chamber; a nozzle block detachably secured to the burner body and having a jet chamber communicating with said combustion chamber 52, and having an air duct 64 adapted to be connected with a source of air under pressure, and having a separate combustion air duct 61 connecting said combustion chamber with atmosphere; a burner fuel nozzle 77 extending into said jet chamber; means for supplying fuel to said fuel nozzle; an air nozzle 65 connected with said air pressure duct 64 and extending into said jet chamber to cause fuel to be lifted through the fuel nozzle and sprayed into the combustion chamber; and an air nozzle 68 connected with the air pressure duct and projecting into the combustion air passage whereby to induce the flow of combustion air from atmosphere to the combustion chamber.

3. In a fuel burner for heating the fuel charge of an internal-combustion engine, the combination with a member attached to the engine intake and having a fuel passage 33 and a heating chamber 41 for the passage; of a burner body 50 providing a combustion chamber 52 attached to said member and communicating with the heating chamber; a nozzle block detachably secured to the burner body and having separate air passages; a burner fuel nozzle and an engine fuel nozzle both supported by the block and each connected with an air passage; means for supplying fuel to said nozzles; and means for conducting fuel from the engine fuel nozzle from the nozzle block through said chambers and into the engine fuel passage.

4. In engine fuel apparatus, the combination with a carburetor including a frame provided with a fuel passage and a heating chamber, and including a float bowl supported by the frame; of a fuel burner well supported by the float bowl; a fuel burner mounted on the frame and communicating with said heating chamber and extending over said fuel well, and having two nozzles extending vertically from the well to the burner, one of the nozzles supplying fuel to the burner and the other fuel for the engine; and a heating pipe for connecting the engine nozzle with the engine fuel passage and extending through the burner and heating chamber.

5. In a means for producing an explosive mixture from air and liquid fuel for an internal-combustion engine, in combination, a main atomizer having a constant level liquid fuel chamber for supplying the main fuel mixture to said engine, and a fuel burner for heating the mixture supplied by said main atomizer, said fuel burner including a second atomizer for supplying fuel to said burner, and a third atomizer for supplying a rich fuel mixture to said engine, and a duct for leading said rich fuel mixture through said burner whereby it will be heated to a higher temperature than said main fuel mixture.

In testimony whereof we hereto affix our signatures.

JOHN H. HUNT.
HUGH WALLACE.